United States Patent [19]

Dahl-Bettermann-Winand

[11] Patent Number: 5,068,495
[45] Date of Patent: Nov. 26, 1991

[54] JUNCTION BUS FOR CABLE CONNECTIONS, IN PARTICULAR FOR CABLE CONDUITS

[76] Inventor: Ursula Dahl-Bettermann-Winand, Wiesenweg 39, D-5064 Rösrath, Fed. Rep. of Germany

[21] Appl. No.: 372,356
[22] PCT Filed: Dec. 12, 1987
[86] PCT No.: PCT/DE87/00590
§ 371 Date: Jun. 16, 1989
§ 102(e) Date: Jun. 16, 1989
[87] PCT Pub. No.: WO88/04853
PCT Pub. Date: Jun. 30, 1988

[30] Foreign Application Priority Data
Dec. 16, 1986 [DE] Fed. Rep. of Germany ....... 3642895

[51] Int. Cl.[5] .............................................. H02G 3/08
[52] U.S. Cl. ................................... 174/65 R; 439/460
[58] Field of Search ............. 174/65 R, 135; 439/460, 439/469; 24/130

[56] References Cited
U.S. PATENT DOCUMENTS 551,032 12/1895 Hemphill ........................... 24/130 X
2,503,327 4/1950 Fields ................................. 24/130 X
3,574,900 4/1971 Emery ................................... 24/130
4,416,503 11/1983 Hayes ................................... 439/469
4,896,403 1/1990 Vouros ................................. 24/130

Primary Examiner—Leo P. Picard
Assistant Examiner—David A. Tone
Attorney, Agent, or Firm—Eckert Seamans Cherin & Mellott

[57] ABSTRACT

The junction box for cable connections is designed as an equipment box or junction box for cable conduits and has a bottom (20) and at least one lateral wall (22), in which is provided a slot (26) for insertion of a cable (28). This slot is open either towards the upper free edge (30) of the sidewall (22) or separated from the latter by a cross-piece (68) and the width of its internal opening is progressively narrower towards the bottom (20). Projecting from the walls (40) of the slot (26) are retaining protuberances facing the opposite wall (40), which secure an inserted cable (28). At least one slit (46) is provided in the sidewalls (26), laterally and separated from said slot (26) by an elastic region of the wall measuring a few millimeters. Said slit (46) becomes narrower when the cable is inserted (28) in the slot (26) and thus provides the walls (40) of the latter with a certain degree of elasticity.

9 Claims, 2 Drawing Sheets

JUNCTION BUS FOR CABLE CONNECTIONS, IN PARTICULAR FOR CABLE CONDUITS

The invention pertains to an electric socket for cable connections, especially an equipment socket or a connecting socket for use in cable channels, which have a base and at least one side wall in which a recess is provided for passing through a cable into the inner chamber of the socket, is preferably made in a single piece from a plastic that has been formulated to be hard, and can be closed by a cover.

Electric sockets of this type are used in interior chambers of different cable channels, especially railing channels. For this reason, they have special fastening devices, for example, legs provided with slits, which can be clipped over a profile projection in the interior cavity. They are intended for accommodating equipment, for example, switches, plugs, or the like, but can also be used as branch plugs, distributor plugs, etc. For introducing a cable into their interior, the recess is provided which in the previously known electric sockets is premanufactured but not yet formed and is produced as a circular opening. It can be made clear by breaking out; a stress relief device for the cable or a passage device, for example, a piece of rubber tubing, can be pressed into the circular opening thus formed.

Such electric sockets are relatively difficult to install. Passing a cable through the circular recess takes some effort, but the subsequent wiring of the ends of the cable introduced with a device, with other cables, or the like, is especially disadvantageous. Since the recesses are located close to the base, the cables open into the socket in the inner area of the side wall; their individual conductors must first be arched up out of the interior space to make them accessible. For this purpose, an adequate free length is usually left for each individual conductor so that the electrical connections can be conveniently produced outside the electric socket. Thus, the connection is far too long. This has the disadvantage that the individual conductors must be folded or looped to fit into the socket. In addition, during assembly, the wire ends project transversely to the base of the socket, and therefore, they must usually be bent over once again for connecting a device. This is tedious, and as a result of the excessive cable lengths which are nevertheless needed for installation, it is necessary to store the cable ends carefully within the socket.

This is where the invention comes in. It has posed the task of further developing the previously known electric socket of the type initially mentioned in such a way that, on the one hand, the introduction of the cable through the recess into the interior chamber of the socket is simplified, and on the other hand, the electrical connection to the conductors of the cable can be made more conveniently and in a shorter time.

Beginning from the electric socket of the initially mentioned type, this goal is achieved in that the recess has an inlet area in the vicinity of the upper free edge of the side wall, which is open to the top or closed via a bar, that the recess, beginning from this inlet area, has its opening tapered toward the base and has retention projections pointing at an angle to the base.

and finally at least one slit is formed by an elastic wall region of this recess a few millimeters wide, placed separately in the side wall, which narrows when a cable is pressed into the recess and thus gives the side walls of the recess elasticity.

In these recesses, the cables are no longer introduced transverse to the side wall through the round, perforated recess; instead they are pressed from the top, transverse to their cable access, into the recess. The side walls of the recess are provided, on the one hand with the retention projections, and on the other hand, are elastic, as a result of which they can retain the cable when it is pressed into the recess. As a result of the slits provided adjacent to the side walls of the recess but separate from the recess, it is possible to ensure that the side walls of the recess, despite the use of a hard formulated plastic, have an elasticity, so that upon pressing a cable into the recess, tapering toward the base, they become somewhat broader when an elastic clamping of the cable is achieved.

In other words, the provision of the slits ensures that a bar of plastic material a few millimeters wide remains between the corresponding side walls of the recess and the slit, which because of its small width has a certain elasticity in the side wall plane in question. This elasticity is utilized, on the one hand, for pressing the cable into the recess, and on the other hand, it exerts a spring force which retains the cable, once pressed in, elastically between the retention projections.

Thus, the electric socket in accordance with the invention makes possible clearly simplified wiring and simplified electrical connection. The wiring can be performed outside the socket, for example, a switch can be connected to the conductor of the cable before the cable is pressed into the recess. The cable is pressed into the recess and retained permanently there only after the electrical connections have been produced. As a result, longer connection ends required only for installation can be dispensed with, as can the need for carefully positioning them in the interior of the socket afterwards.

In addition, the electric socket produced in accordance with the invention permits tension relief of the cable pressed into the recess. Because of the Christmas tree-like slits produced, not only is the cable, once pressed in, prevented from slipping out of the recess, but it is also ensured that the cable, once introduced, can no longer be moved in its longitudinal direction. Separate tension relief means, for example, sleeves or the like, thus become unnecessary.

In a preferred further development of the invention, the inlet area of the recesses has a rounded shape of its side walls; beginning from a constriction located in the vicinity of the edge, it expands into a fixing area in which a cable can be pressed for temporary fixation. The thus temporarily fixed cable can also be completely removed again from the recess. The fixing area does not serve for permanent retention and stress relief on the cable, but brings about fixation of the cable while the electrical connections are being made. Thus, a type of clamp is formed which permits practical positioning of the cable in its correct location during connection of the cable. Once the electrical connections have been made, the individual cables are pressed further into the recess; they then enter the clamping area, where they are fixed, and the stress on them is relieved, by retention projections.

Advantageously, on at least one side of the constriction shorter slits are also provided which make the walls of the constriction elastically yielding, so that a cable can be pressed through the constriction into the fixing area. These slits can also be used to retain the cover of the socket; for this purpose, the cover on its inside has inward pointing protrusions which fit into the slits of the constriction.

The cover itself preferably has lugs with break-off sites projecting in the area of the recesses. When the cover is closed, these lugs have their free edges against the cable located in the recess and, as a supplement to the retention projections, prevent the cable from moving out of the recesses. They also permit a closure of the recesses that is safe from contact in that they cover the recesses between the cable and the inlet area.

The slits which guarantee the elasticity of the side walls of the recess can also be designed to be covered so that it is not possible to directly reach the interior of the socket through them.

The recesses impair the mechanical strength of the side walls, especially when two recesses per side wall are provided. In contrast to the previously known socket, which has a solid, uninterrupted margin to the side walls, the side walls are subdivided by the recesses so that they show a certain elasticity. To reduce this, it is suggested that stiffening be provided which especially connects the side wall areas located between two recesses in triangular shape with the base and supports it against the base.

On the whole, the invention offers considerable simplification in the production of the electrical connections, since the socket can be used as a type of guide in which the cables to be joined or connected can be temporarily placed. In addition, the clamping regions of the recesses provided with retention projections also offer a reliable, permanent fixation in the cable direction as well, therefore making additional stress relief devices unnecessary. Here also, installation is simplified since no additional parts are required. Finally, it is no longer necessary to store long conductor ends in the interior of the socket.

Additional features and advantages of the invention will result from the other claims as well as the description of exemplified embodiments of the invention, which are to be understood as nonlimiting and will be explained in further detail below with reference to the drawing. In the drawing.

Figure 1:
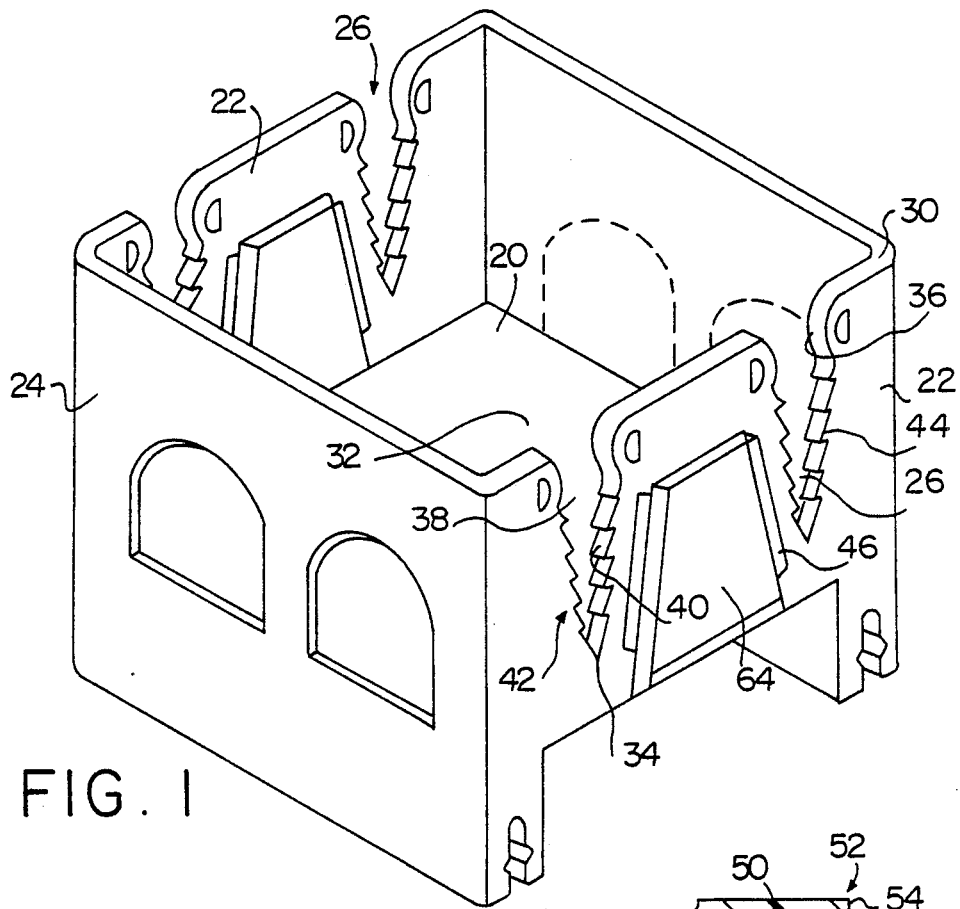
FIG. 1 shows a perspective view of an electric socket according to the invention.

The electric socket shown in FIG. 1 is provided as an equipment socket or connecting socket for cable channels; it has two lower, penetrating feet, which are open in the downward direction in an undercut receiving groove. The two receiving grooves are each pressed onto a strip of the profile; in this way the electric socket is fastened in the cable channel.

The socket itself consists, in a single piece, of a square base 20 and four side walls 22. 24, of which opposing side walls are formed identically in each case. The two side walls 22 in each case have two recesses 26 for passing through one cable 28 in each case into the interior chamber of the socket. These recesses will be described in detail below. The other two side walls 24 are equipped with half-arch-shaped press-through areas. These press-through areas can be removed; an appropriately shaped rubber sleeve can be pressed into the windows formed in this way.

The recesses 26 are always made identical; they are open in an inlet area 32 toward the upper, free edge 30 of the side wall 22 and generally taper from this inlet area 32 to their lower end area 34, where they come to a point. The recesses 26, beginning from the edge 30, first have a constriction point 36, which is followed—proceeding downward—by a further bent-out area, which will be called the fixing area 38 below. In the vicinity of the constriction 36 and the fixing area 38, the walls 40 of the recess 26 are curved in approximately an S shape or in any case they are curved.

A profile area with a Christmas tree profile, called the retention area 42 below, begins below the fixing area. Here the two walls 40 of the recess 26 essentially taper in a V shape toward the lower end area 34; but rounded, beak-like retention projections 44 stand out from them, forming a sawtooth curve and in general being directed downward at an angle to the base 20. They are arranged such that a cable 28, which is pressed into the lower end area 34, rests on their longer sawtooth flanks and as a result can be pressed well into the lower end area 34 in the retention area 42 of the recess 26. However, if it is desired to lift the cable 28 once again in the opposite direction back to the inlet area 32, the shorter sawtooth flanks come into action, opposing this movement and thus retaining the cable 28.

Only on one side of each recess 26, specifically on the sides facing one another, there is a slit 46 in the vicinity of the adjacent toothed wall 40, being about 2 mm wide and following the overall course of the wall 40 in the retention area 42. Between it and the retention area 42, a narrow elastic bar of material remains, which is an average of about 5 mm wide. The thickness of the side wall 22 is about 2.5 mm; the socket is made of a hard plastic, for example, polystyrene or PVC.

Figure 2:
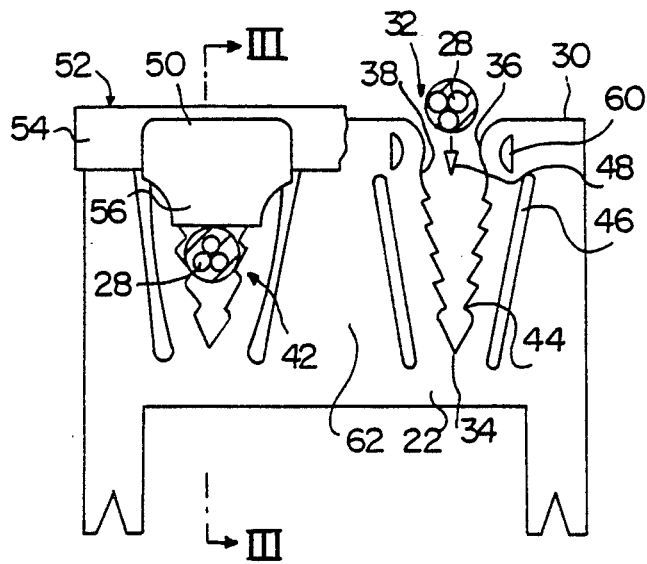
FIG. 2 shows a side view of an electric socket similar to FIG. 1.

Through the slit 46, the two adjacent walls 40 of each side wall 22 have some elasticity transverse to the longitudinal direction of the slit 46, as is made clear in detail in FIG. 2:

In FIG. 2 above the inlet area 32 of the right recess 26. a cable 28 is shown which is to be pressed into the right-hand recess 26 in the direction of the arrow 48. This is a three-wire cable with 1.5 mm$^2$ rigid copper conductor.

In contrast to the embodiment in accordance with FIG. 1, in the embodiment according to FIG. 2 slits 46 are provided at intervals of a few millimeters with respect to both walls 40 of the retention area 42; they once again have a width of about 2 mm and a length that corresponds to the total length of the adjacent wall 40 in the retaining area 42.

Into the left-hand recess 26 according to FIG. 2, a corresponding cable 28 is already pressed; during pressing-in, the V-shaped retaining area 42 is spread outward; the slits 46 have yielded and have become narrower. The cable 28 is pressed by the elastic restoring force of the bar between the wall 40 and the slit 46 from left and right, so that it is retained Because of the sawtoothprofile, the lateral pressing force does not mean that the cable can escape in an upward direction.

The cable 28 described is additionally secured in the left recess 26 by a protrusion 50 of a cover 52. From the edge 54 of the cover 52, lugs 56 project parallel to the edge 54, having indicated breakage sites marked at different heights. The corresponding indicated breakage site for three-wire NYM cable has been broken through; the broken-off, lower free surface 58 of the lug 56 lies at the top on the additionally fixed cable 28 and further ensures its retention in the recess 26, especially in the case of movements, vibrations or the like of the cable 28.

Figure 3:
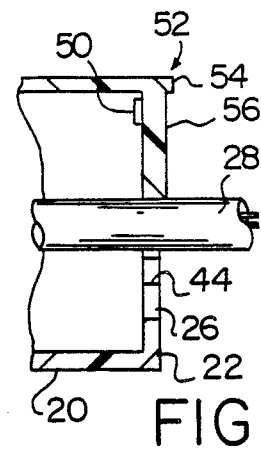
FIG. 3 shows a section along the sectional line III—III in FIG. 2.

As is especially apparent from FIG. 3, the lug 56 projects into the area of the recess 26 and almost completely fills its cavity above the cable 28. This also ensures that the area of the recess 26 remaining above the cable 28 is covered and the inside of the socket is not accessible through this opening.

The design of the lug 56 is basically arbitrary; these lugs can also interact with the sawteeth of the wall 40 of the retaining area 42. Development of the recesses 26 is also possible without sawtooth profiles of their walls 40. The only decisive factor is that an adequate clamping effect, for example, by self-retention, of the cable 28 in the V-shaped retaining area 42 is achieved.

The open space between the walls 40 in the vicinity of the constriction 36 is smaller than the external diameter of the cable 28. To be able to press the cable 28 in the direction of the arrow 48 through the constrictions 36 of the right recess 26 in FIG. 2, the walls 40 in the vicinity of the constriction 36 are also formed in an elastically yielding manner, in that at distances of a few millimeters to the side of them a slit 60 is provided, which in this case has the form of a circular segment. Facing the respective wall 40 of the constriction 36, the curvature of the slit 60 means that between this wall 40 and the slit 60 an area of material remains that has approximately a constant thickness, in this case a wall thickness of about 3.5 mm. Because of this lower wall thickness, the walls 40 can more easily be pressed into the area of the constriction 36 than in the retaining area 42.

If the cable 28 is pressed through the constriction 36, it enters the fixing area 38. Here it is almost exclusively held transverse to its cable axis, but not in the direction of the cable axis. In the fixing position, the cable 28 can be connected to another cable or an electrical device. Once this work is complete, the cable 28 is pressed further in the direction of the arrow 48 into the recess 26 until it occupies the position drawn in FIG. 2 for the left-hand recess 26. This condition is the finished installation state.

Between the two recesses 26 of each side wall 22, a side wall area 62 remains, which is essentially only still linked with the base 20, but not with the side wall parts 22 on the other side of the recess 26. Here the risk exists that this side wall area will be too elastic transverse to its principal surface, as a result of which once again the retention of the cable 28 in the two recesses 26 could be impaired. To sufficiently support the side wall area 62, projections 64 are provided. They can have the trapezoidal shape shown in FIG. 1, but triangular supports are also possible, which connect the inner wall of the side wall area 62 with the base 20.

Figure 4:
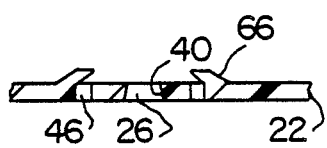
FIG. 4 shows a sectional view through a recess with two covered side slits.

In the exemplified embodiment according to FIG. 4, beaks 66 on the interior of the socket extend over the slits 46, which are not impaired in their functioning by this, but are now covered. It is also apparent from this figure that the walls 40 of the recess 26 follow a V shape; they converge toward the inside of the socket. In this way pulling out of the cable 28 from the socket is additionally impeded.

Figure 5:
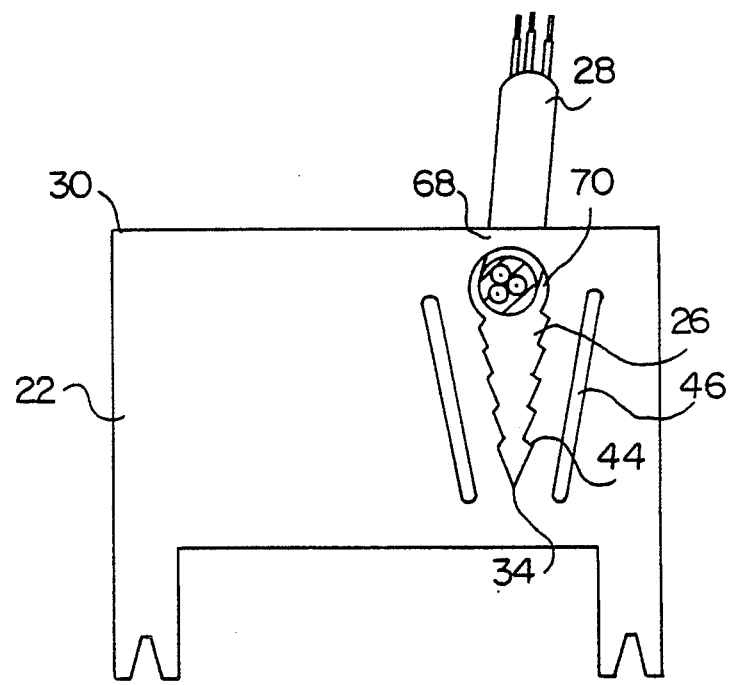
FIG. 5 shows a side view, similar to FIG. 2, of a second exemplified embodiment.

In the exemplified embodiment according to FIG. 5 the recess 26 is not open in the direction of the upper edge 30, but is separated by a bar 68, which with its lower wall closes off the recess 26 at the bottom, so that the recess is an opening that is delimited on all sides. This has the advantage that the mechanical stability of the electrical socket is far less extensively impaired than is the case due to the recesses open in the direction of the top in the exemplified embodiment according to FIGS. 1 to 4. For this reason, the cable 28 can no longer be pressed from the top into the recess 26 open at the top, as is the case in the exemplified embodiment according to FIGS. 1 to 4. Therefore, the cables 28, before they are connected to one another, must be threaded in through the recess 26 open at the top in accordance with FIG. 5. However, since this recess 26 below the bar 68 has an approximately circular intake area 70 or outlet area, the internal diameter of which (see FIG. 5) is distinctly larger, e.g., 30 to 50% larger, than the external diameter of the cable 28 used, on the one hand, the threading-in is facilitated, and on the other hand, the connection of the cable 28 shown with additional cables can take place largely outside of and above the internal chamber of the electric socket, since each cable 28 initially—before connection with the other cables has taken place—remains inside the intake area 70 (as shown in FIG. 5), but can be freely moved there within this part of the recess 26, so that the connection with other cables 28 can be accomplished conveniently above the edge 30, as is indicated in FIG. 5 in that the cable 28 with the area located outside the electric socket is positioned above this electric socket, thus projecting obliquely upward and to the rear in the drawing according to FIG. 5. The connection work is performed there above the socket. Once this work is complete, the connecting area of the cables is pressed down, and the individual cables 28 are fastened such that, beginning from the intake area 70, they are pressed down into the retaining area 42, which is designed in the same way as the connecting area 42 in the exemplified embodiment according to FIGS. 1 through 4. A fixing area 38, as is provided in the exemplified embodiment according to FIGS. 1 through 4, is not necessary, but can be provided between the inlet area 70 and the retaining area 42.

I claim:

1. A junction box for cable connections, comprising; a base; and
at least one side wall attached to the base, said at least one side wall defining a V-shaped recess for receiving a cable, said recess being open to an upper edge of the at least one side wall and becoming narrower toward the base, said recess having an entry region at the upper edge and a retention region toward the base, sides of the recess at the retention region defining retention projections for resisting movement of the cable toward the entry region, said at least one side wall further defining at least one slit adjacent one of the sides of the recess, whereby insertion of the cable into the recess causes deformation of the at least one slit and thereby imparts elasticity to said one of the sides of the recess.

2. The junction box according to claim 1, wherein the sides of the recess define a construction immediately below the entry region, and the at least one side wall defines at least one other slit adjacent the constriction.

3. The junction box according to claim 2, further comprising a cover attached over the at least one side wall and preventing passage of the cable through the entry region of the recess, the cover extending into the recess and having prescribed breakage sites which permit breaking off of pieces of the cover for selectively adjusting a depth of the cover within the recess.

4. The junction box according to claim 3, wherein the cover defines at least one protrusion which is engageable with the at least one other slit adjacent the constriction.

5. The junction box according to claim 1, wherein the retention region defines progressively narrower inwardly inclined edges terminating in the projections.

6. The junction box according to claim 1, wherein the at least one slit extends substantially parallel to said one of the sides of the recess.

7. The junction box according to claim 1, wherein the retention projections have rounded ends to prevent damage to the cable.

8. The junction box according to claim 1, wherein all portions of the sides of the recess are rounded to prevent damage to the cable.

9. The junction box according to claim 1, wherein the at least one side wall defines at least one other V-shaped recess, and wherein a side wall area between adjacent ones of the recesses defines a stiffening projection.

* * * * *

UNITED STATES PATENT AND TRADEMARK OFFICE
CERTIFICATE OF CORRECTION

PATENT NO. : 5,068,495
DATED : November 26, 1991
INVENTOR(S) : Ursula Dahl-Bettermann-Winand It is certified that error appears in the above-identified patent and that said Letters Patent is hereby corrected as shown below:

Title Page:
In the title, the word "BUS" should read --BOX--.

Column 1, line 1, the word "BUS" in the title should read --BOX--.

Column 3, line 64, "22. 24," should read --22, 24,--.

Column 4, line 63, insert a period (--.--) after the word "retained".

Column 5, line 17, "Developmentof" should read --Development of--.

Signed and Sealed this

Sixth Day of July, 1993

Attest:

MICHAEL K. KIRK

Attesting Officer    Acting Commissioner of Patents and Trademarks